United States Patent
Dharmapurikar

(10) Patent No.: US 9,539,514 B2
(45) Date of Patent: Jan. 10, 2017

(54) METHOD AND SYSTEM FOR GENERATING SIGNATURES AND LOCATING/EXECUTING ASSOCIATIONS FOR A GAME PROGRAM

(71) Applicant: Google Inc., Mountain View, CA (US)

(72) Inventor: Makarand Dharmapurikar, Fremont, CA (US)

(73) Assignee: Google Inc., Mountain View, CA (US)

(*) Notice: Subject to any disclaimer, the term of this patent is extended or adjusted under 35 U.S.C. 154(b) by 489 days.

(21) Appl. No.: 13/923,060

(22) Filed: Jun. 20, 2013

(65) Prior Publication Data

US 2013/0344952 A1  Dec. 26, 2013

Related U.S. Application Data

(60) Provisional application No. 61/663,473, filed on Jun. 22, 2012.

(51) Int. Cl.
| | |
|---|---|
| G06K 9/46 | (2006.01) |
| A63F 13/60 | (2014.01) |
| A63F 13/00 | (2014.01) |
| A63F 13/85 | (2014.01) |
| A63F 13/795 | (2014.01) |
| G06K 9/00 | (2006.01) |
| G06T 7/00 | (2006.01) |

(52) U.S. Cl.
CPC ............. *A63F 13/60* (2014.09); *A63F 13/00* (2013.01); *A63F 13/795* (2014.09); *A63F 13/85* (2014.09); *G06K 9/00744* (2013.01); *A63F 2300/209* (2013.01); *G06T 7/0079* (2013.01)

(58) Field of Classification Search
CPC ........................................................ A63F 9/24
See application file for complete search history.

(56) References Cited

U.S. PATENT DOCUMENTS

| | | | | |
|---|---|---|---|---|
| 2001/0036311 | A1* | 11/2001 | Tomomatsu | H04N 1/4074 382/168 |
| 2009/0088233 | A1* | 4/2009 | O'Rourke et al. | 463/7 |
| 2009/0209337 | A1* | 8/2009 | Vrignaud et al. | 463/31 |
| 2011/0281648 | A1* | 11/2011 | Weising | A63F 13/10 463/32 |
| 2012/0102023 | A1* | 4/2012 | Osman | G11B 27/036 707/722 |

* cited by examiner

*Primary Examiner* — James S McClellan
*Assistant Examiner* — Syvila Weatherford
(74) *Attorney, Agent, or Firm* — Bake Hughes Bellermann LLP

(57) ABSTRACT

Disclosed are a method and system for generating signatures and locating/executing associations for a game program. In this way, hints pertaining to particular gameplay contexts for the game program may be located for a user in an automatic manner without requiring the user to manually locate the hint.

15 Claims, 7 Drawing Sheets

METHOD AND SYSTEM FOR GENERATING SIGNATURES AND LOCATING/EXECUTING ASSOCIATIONS FOR A GAME PROGRAM

CROSS-REFERENCE TO RELATED APPLICATIONS

This present application claims the benefit of U.S. Provisional Application No. 61/663,473, filed Jun. 22, 2012, which is hereby incorporated by reference in its entirety.

FIELD OF THE INVENTION

The invention relates to the field of gaming, and in particular to an approach for generating signatures and locating/executing associations for a game program.

BACKGROUND

Many game programs are designed such that the user interacting with the game program is presented various scenes/levels that are to be completed during the course of gameplay. Often times, scenes/levels are designed to challenge the user in a way that requires the user to attempt several different strategies before finding one to successfully complete the level/scene. When users exhaust their own strategies to no avail, they often turn to tutorials, forums, or online videos in an attempt to find successful strategies for completing the level/scene.

One approach for locating a successful strategy for completing a scene/level may involve consulting a tutorial, forum, or online video. However, these resources are external to the game program and require the user to perform a manual search in order to find successful strategies that fit the particular gameplay context that the user is currently in. Moreover, the user may find himself in a gameplay context for which a successful strategy doesn't exist, or where a successful strategy does not exactly fit the user's needs.

Some game programs have built-in hints, however, these hints are fixed at particular points within the game program such that a user struggling with an uncommon gameplay context may not have any hints available. Moreover, these hints are often very basic, providing the user with very limited assistance.

SUMMARY

Some embodiments of the present invention provide a method and system for generating signatures and locating/executing associations for a game program. In this way, hints pertaining to particular gameplay contexts for the game program may be located for a user in an automatic manner without requiring the user to manually locate the hint.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

According to some embodiments, a method is provided in which game context information associated with a game program is extracted, recognition is performed on the extracted game context information to generate a signature corresponding to the game context, and an association is located for the signature, which may be executed upon user request.

Figure 1:
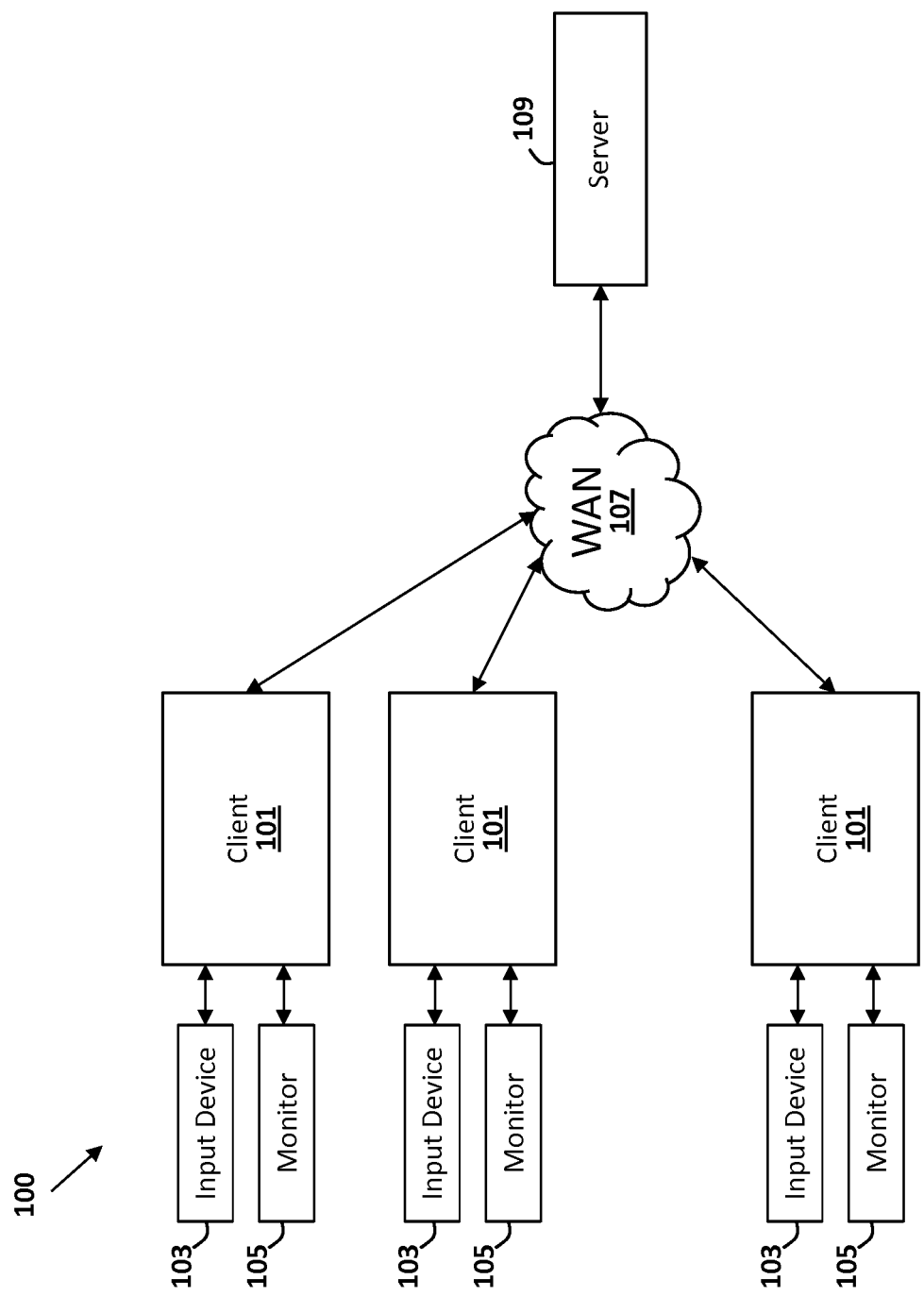
FIG. 1 illustrates a block diagram of a client-server architecture.

The method for generating signatures and locating/executing associations for a game program may be performed using a client-server architecture, wherein one or more client devices may interact with games running on a server by way of a network. FIG. 1 illustrates a typical client-server architecture 100, wherein a plurality of clients 101 are connected to a server 109 over a wide area network (WAN) 107. The server 109 and client devices 101 may all be located in different physical locations. Each game program resides on the server 109. Each client 101 may have an input device 103 and monitor 105. Such input devices may include keyboards, joysticks, game controllers, motion sensors, touchpads, etc. The client 101 interacts with the game program by sending inputs to the server 109 using its respective input device 103. The server 109 processes the client's inputs (e.g., using a CPU) and renders video images (e.g., using a GPU) in accordance with the client inputs. Alternatively, the server 109 may generate graphics commands that are sent to the client device 101 such that the client device 101 may render the video images. By utilizing a client-server architecture 100, the workload of the client device 101 may be significantly reduced as a portion of the processing associated with running the game program may be offloaded to the server.

Many game programs are designed such that the user interacting with the game program is presented various scenes/levels that are to be completed during the course of gameplay. Often times, scenes/levels are designed to challenge the user in a way that requires the user to attempt several different strategies before finding one to successfully complete the level/scene. When users exhaust their own strategies to no avail, they often turn to tutorials, forums, or online videos in an attempt to find successful strategies for completing the level/scene.

One approach for locating a successful strategy for completing a scene/level may involve consulting a tutorial, forum, or online video. However, these resources are external to the game program and require the user to perform a manual search in order to find successful strategies that fit the particular gameplay context that the user is currently in. Moreover, the user may find himself in a gameplay context for which a successful strategy doesn't exist, or where a successful strategy does not exactly fit the user's needs.

Some game programs have built-in hints, however, these hints are fixed at particular points within the game program such that a user struggling with an uncommon gameplay context may not have any hints available. Moreover, these hints are often very basic, providing the user with very limited assistance.

The following description is provided with specific examples pertaining to a method for performing recognition on a game program to generate a signature that is used to locate hints for particular contexts of a game program, however one ordinarily skilled in the art will recognize that the method can be extended to locate any association (e.g., any information associated with a particular signature of a game program) for a signature generated for the game program.

Figure 2:
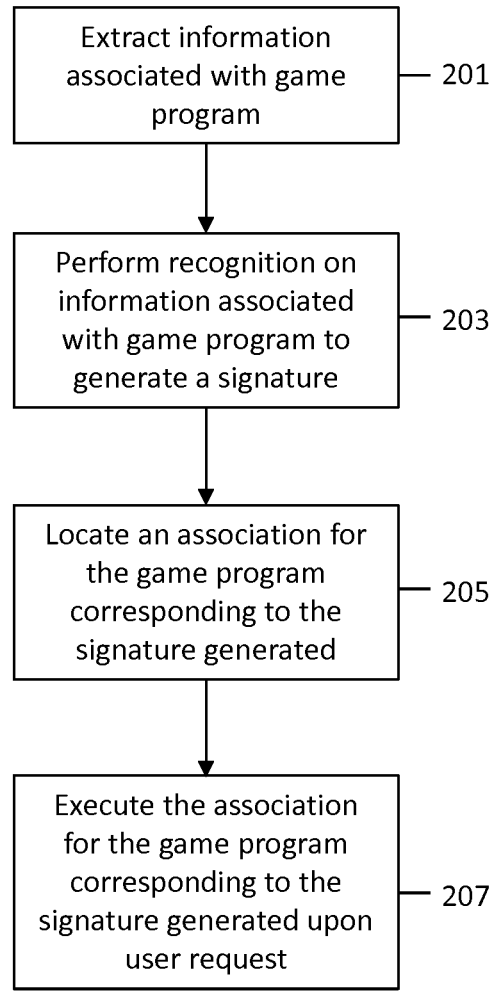
FIG. 2 is a flow diagram illustrating a method for performing recognition on a game program to generate a signature and executing an association corresponding to the generated signature according to some embodiments.

FIG. 2 is a flow diagram illustrating a method for performing recognition on a game program to generate a signature and executing an association corresponding to the generated signature according to some embodiments.

Information associated with the game program is first extracted from the game program as described at 201. In some embodiments, such information may be graphics commands associated with a scene of the game program. For example, all the graphics commands needed to render a game context (e.g., scene) that the user playing the game is currently in may be extracted. In other embodiments, other information associated with the game program (e.g., pixels making up a scene of the game program, specific objects of a scene of the game program, etc.) may be extracted.

The graphics commands associated with the scene of the game program may be extracted in response to a user of the game program selecting the scene. For example, a user stuck at a particular gameplay context (e.g., scene) may select that particular gameplay context (e.g. scene) for recognition, signature generation, and hint location, which will be discussed in further detail below.

Once the information associated with the game program has been extracted, recognition is performed on the information to generate a signature associated with that information as described at 203. In embodiments where the extracted information are graphics commands associated with a scene, the graphics commands may be analyzed to generate a signature corresponding to the scene, which will be discussed in further detail below. In other embodiments, the extracted information may be the actual pixels associated with a particular scene of interest, and the recognition may involve determining what gameplay context (e.g., signature) corresponds to the pixels. One ordinarily skilled in the art will recognize that various methods and mechanisms may be used to perform recognition on information associated with a game program to generate a signature associated with that information.

An association for the game program corresponding to the signature generated may then be located as described at 205. In some embodiments, the association for the game program may be located using a database that stores signature and association combinations. The database may be stored at the server at which the game program is being executed or may be stored externally to the server. In other embodiments, the association for the game program may be located using a third party component that analyzes the signature and does an independent search to locate any associations that may be pertinent to the signature.

In some embodiments, the associations located for the signature may be hints or video clips associated with the scene corresponding to the signature. For example, the gameplay context selected by the user may be associated with several different user uploaded video clips showing other users defeating that particular gameplay context.

An association for the game program corresponding to the signature generated may then be executed upon user request as described at 207. In some embodiments, the user may be presented several different associations for a particular signature, and may select one of the associations to be executed. Executing the association may involve loading a video clip to be displayed on a web browser of the user. For example, the user may select a video clip of another user defeating the gameplay context, and the video may be automatically loaded into an external browser of the user for viewing.

By extracting information associated with a game program, performing recognition on the information associated with the game program to generate a signature, and locating an association for the game program corresponding to the signature generated, hints pertaining to particular gameplay contexts may be located for the user in an automatic manner without requiring the user to manually locate the hint (e.g., consulting a tutorial, searching a forum, or searching for an online video). Instead, the server executing the game program may perform recognition to generate a signature and automatically locate associations corresponding to the signature for the user using a database that includes combinations of signatures and corresponding associations. Alternatively, the server executing the game program may perform recognition to generate a signature and request a third party to locate corresponding associations. Either way, the user is relieved of having to manually locate associations corresponding to the selected gameplay context. An additional benefit of extracting information associated with a game program, performing recognition on the information associated with the game program to generate a signature, and locating an association for the game program corresponding to the signature generated is that hints may be located for uncommon gameplay contexts that may be unavailable with built-in hints of the game program.

Figure 3:
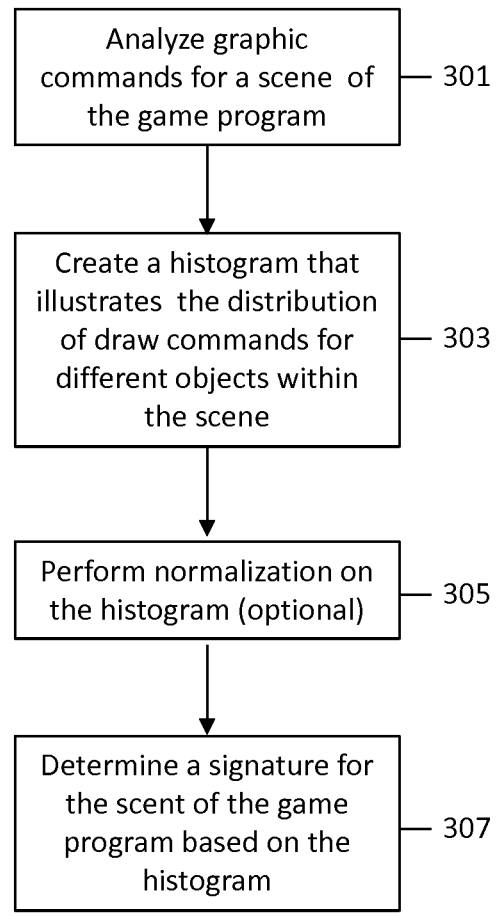
FIG. 3 is a flow diagram illustrating a method for generating a signature according to some embodiments.

FIG. 3 is a flow diagram illustrating a method for generating a signature according to some embodiments. This method may be used where the information extracted from the game program includes graphic commands for a scene of the game program, however, one ordinarily skilled in the art will recognize that other methods for generating a signature for a game program may also be used.

After the graphics commands for the scene of interest in the game program has been extracted, the graphic commands for that scene are analyzed as described at 301. Analyzing the graphic commands may involve identifying draw commands for particular objects of the scene of interest. For example, the graphics commands may include one set of draw commands that are used to render one object in the scene and another set of draw commands that are used to render another object in the scene.

A histogram may then be created that illustrates the distribution of draw commands for different objects within the scene of interest as described at 303. The histogram may include several buckets, each bucket corresponding to a range of draw commands required to render an object within the scene. For example, a first bucket may correspond to objects that require 0-50 draw commands, a second bucket may correspond to objects that require 51-100 draw commands, etc. Each object in the scene of interest is rendered using a particular number of draw commands A door in the scene may require 30 draw commands, while a more complex object may require more than 50 draw commands. The histogram illustrates the total number of objects in the scene for each different range of draw commands For example, there may be 10 objects in a scene that require between 0-50 draw commands, 25 objects that require between 51-100 draw commands, etc. Because different scenes of interest within a game program will most likely have a unique distribution of draw commands for objects within the scene, the histogram can be used to determine a signature for each scene of interest.

Normalization may then optionally be performed on the histogram as described at 305. Normalization is performed where scenes that should correspond to the same signature have slight variations. For example, one histogram corresponding to a scene may have 31 objects that require between 51-100 draw commands while another histogram that corresponds to the same scene has 32 objects that require between 51-100 draw commands. This may be due, for example, to the user having taken different paths in arriving at the scene. By normalizing the histogram, scenes corresponding to the same signature will be mapped to the same signature even though slight variations exist between them.

A signature for the scene of the game program may then be determined based on the histogram as described at 307. In some embodiments, the signature may be determined using a normalized histogram. In other embodiments, the signature may be determined from the histogram without performing normalization. The signature may be determined by comparing the histogram to a table of histogram/signature combinations to determine the signature that corresponds to the created histogram.

The signature may then be used to locate and execute associations corresponding to the signature as described above.

Figure 4:
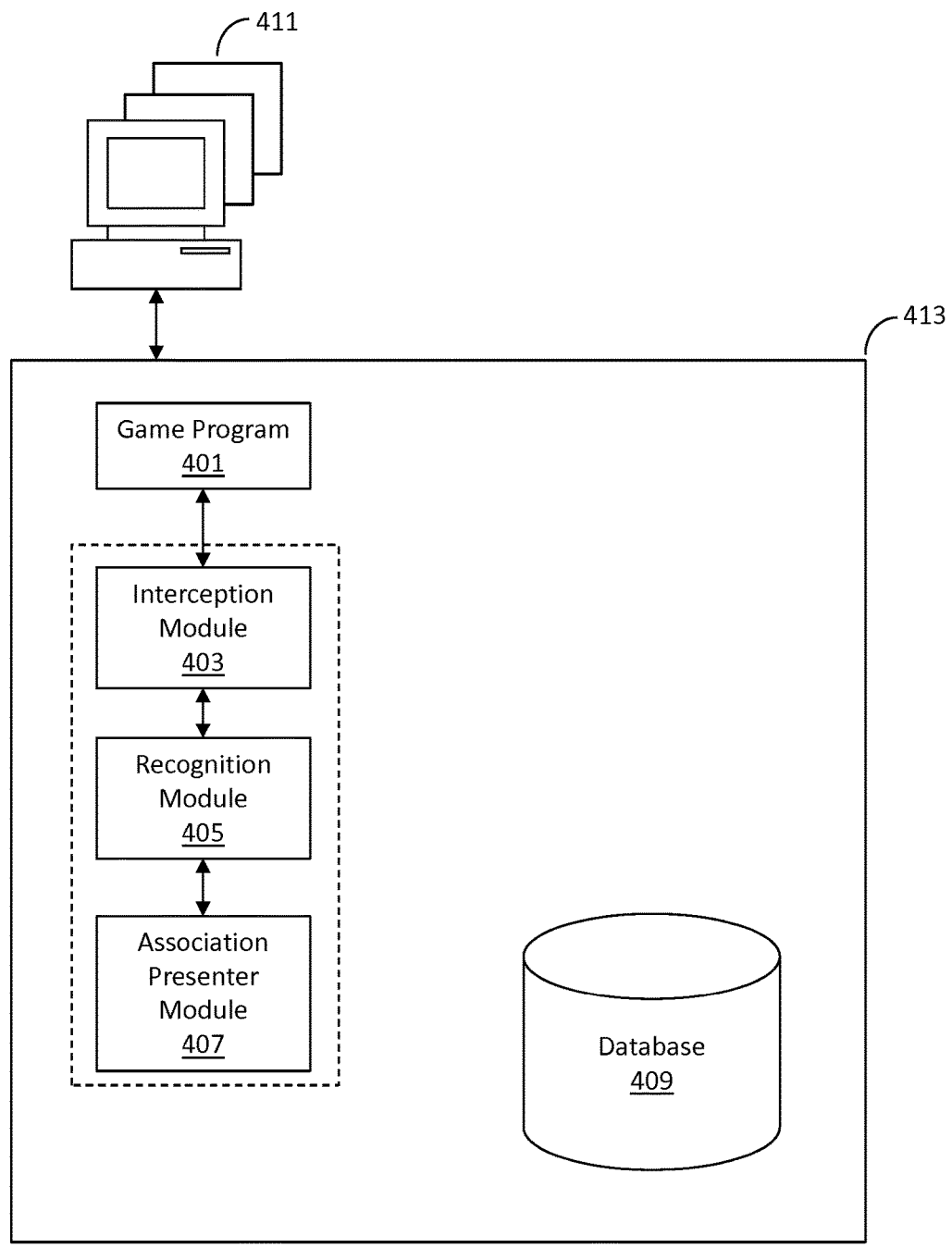
FIG. 4 is a block diagram illustrating an example system configured to perform recognition on a game program to generate a signature and execute an association corresponding to the generated signature according to some embodiments.

FIG. 4 is a block diagram illustrating an example system configured to perform recognition on a game program to generate a signature and execute an association corresponding to the generated signature according to some embodiments. A server, such as the one described above in FIG. 1 may be used to perform recognition on the game program to generate a signature and execute an association corresponding to the generated signature. For purposes of example, the system of FIG. 4 will be described for a single client executing a single game program on the server. However, one ordinarily skilled in the art will recognize that system may be extended to encompass multiple clients executing multiple game programs on the server.

The system of FIG. 4 includes a client device 411 executing a game program 401 on the server 413. The server 413 includes an interception module 403, a recognition module 405, and optionally an association presenter module 407. A user of the client device 411 interacts with the game program 403 executing on the server 413 in the same manner as described above in FIG. 1.

During interaction with the game program 401, the user may select a particular scene of interest. For example, a user stuck at a particular scene may select that particular scene for recognition, signature generation, and hint location. Information associated with the scene of interest in the game program may then be extracted by the interception module 403. In some embodiments, all the graphics commands needed to render the scene of interest may be extracted. In other embodiments, other information associated with the game program (e.g., pixels making up a scene of the game program, specific objects of a scene of the game program, etc.) may be extracted.

The information extracted by the interception module 403 may then be passed to the recognition module 405 for performing recognition on the extracted information to generate a signature. In some embodiments, the recognition module 405 may be configured to perform recognition on the extracted information in the same manner as described above in FIG. 3. However, one ordinarily skilled in the art will recognize that various methods and mechanisms may be used to perform recognition on information associated with a game program to generate a signature associated with that information.

The recognition module 405 may also be configured to locate an association for the game program corresponding to the signature generated. The associations located for the signature may be hints or video clips associated with the scene corresponding to the signature. For example, the scene of interest selected by the user may be associated with several different user uploaded video clips showing other users defeating that particular scene of interest. The association for the game program may be located using a database 409 that stores signature and association combinations. The database may be stored at the server 413 at which the game program is being executed as illustrated in FIG. 4 or may be stored externally to the server 413.

As discussed above, the association for the game program may be alternatively be located using a third party component (not shown) that analyzes the signature and does an independent search to locate any associations that may be pertinent to the signature.

An association presenter module 407 may then be used to execute the located association upon user request. In some embodiments, the user may be presented several different associations for a particular signature, and may select one of the associations to be executed. Executing the association by the association presenter module 407 may involve loading a video clip to be displayed on a web browser of the user. For example, the user may select a video clip of another user defeating the gameplay context, and the video may be automatically loaded into an external browser of the user for viewing.

Figure 5:
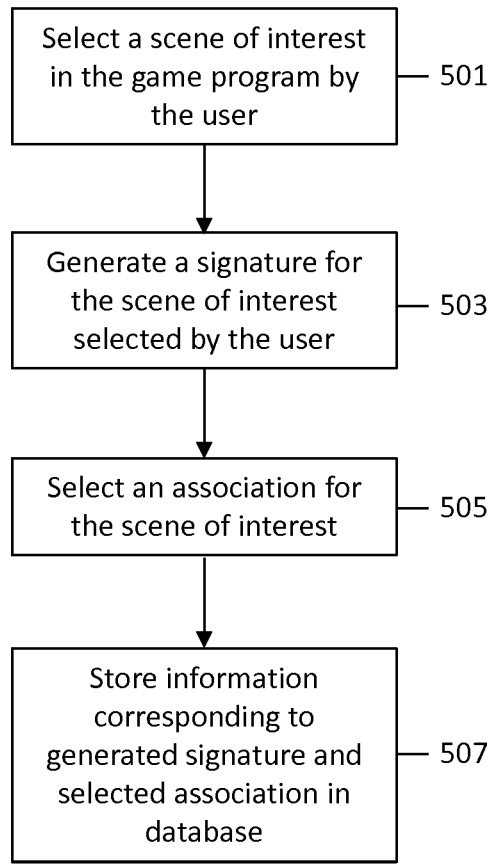
FIG. 5 is a flow diagram illustrating a method for populating a database with associations corresponding to signatures for a game program according to some embodiments.

By configuring the server to extract information associated with a game program, performing recognition on the information associated with the game program to generate a signature, and locate an association for the game program corresponding to the signature generated, hints pertaining to particular gameplay contexts may be located for the user in an automatic manner without requiring the user to manually locate the hint (e.g., consulting a tutorial, searching a forum, or searching for an online video). Instead, the server executing the game program may perform recognition to generate a signature and automatically locate associations corresponding to the signature for the user using a database that includes combinations of signatures and corresponding associations. Alternatively, the server executing the game program may perform recognition to generate a signature and request a third party to locate corresponding associations. Either way, the user is relieved of having to manually locate associations corresponding to the selected gameplay context. An additional benefit of extracting information associated with a game program, performing recognition on the information associated with the game program to generate a signature, and locating an association for the game program corresponding to the signature generated is that hints may be located for uncommon gameplay contexts that may be unavailable with built-in hints of the game program FIG. 5 is a flow diagram illustrating a method for populating a database with associations corresponding to signatures for a game program according to some embodiments.

A user interacting with a game program may select a scene of interest in the game program as described at 501. A signature may then be generated for the scene of interest selected by the user as described at 503. The signature may be generated in the same manner as described above in FIG. 2. The user may then select an association for the scene of interest as described at 505. For example, the user may record a video clip of his solution for defeating the scene of interest or locate an external video clip of a different user defeating the scene of interest. The selected association may then be stored along with a reference to its corresponding signature in a database as described at 507. The selected association may then be subsequently used for future association location.

Figure 6:
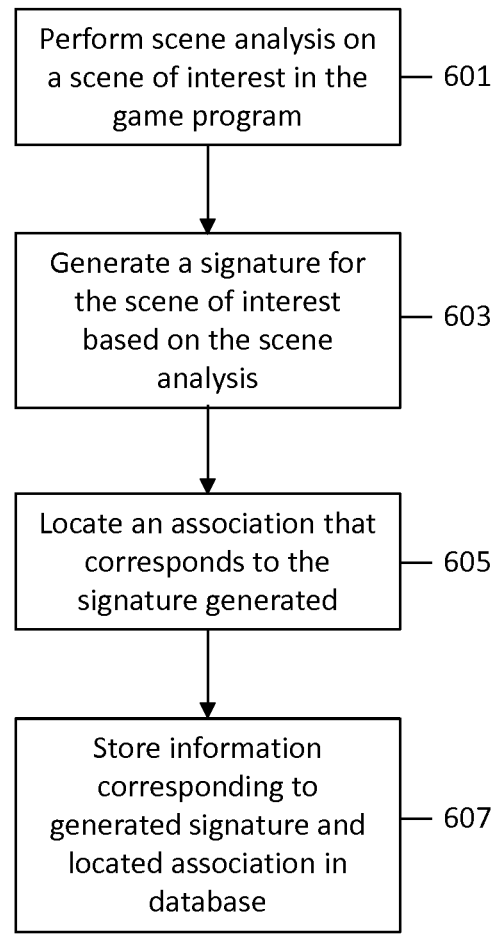
FIG. 6 is a flow diagram illustrating an alternative method for populating a database with associations corresponding to signatures for a game program according to some embodiments.

FIG. 6 is a flow diagram illustrating an alternative method for populating a database with associations corresponding to signatures for a game program according to some embodiments. A third party component may be used to populate a database with associations corresponding to signatures for a game program, as discussed above. Initially, the third party component may perform scene analysis on a scene of interest in the game program as described at 601. In some embodiments, the third party component may perform scene analysis on the scene of interest in the same manner as described above in FIG. 2.

A signature may then be generated by the third party component based on the scene analysis performed, as described at 603. Once the third party component has generated a signature for the scene of interest, an association that corresponds to the signature may be located by the third party component as described at 605. One ordinarily skilled in the art will recognize that the third party component may locate an association in any number of ways. For example, the third party component may perform scene analysis on the scene of interest to determine what game context the scene of interest pertains to and independently locate associations (e.g., game hints) that correspond to that particular game context.

After the association has been located, the third party component may store information corresponding to the generated signature and the located association in a database as described at 607. The information may include the generated signature and a pointer/link to the located association. The stored information may then be subsequently used for future association location.

In this way, the embodiments of the invention provide a way for recognizing a particular game context that a user may have interest in and locating a successful strategy for overcoming that particular game context.

Figure 7:
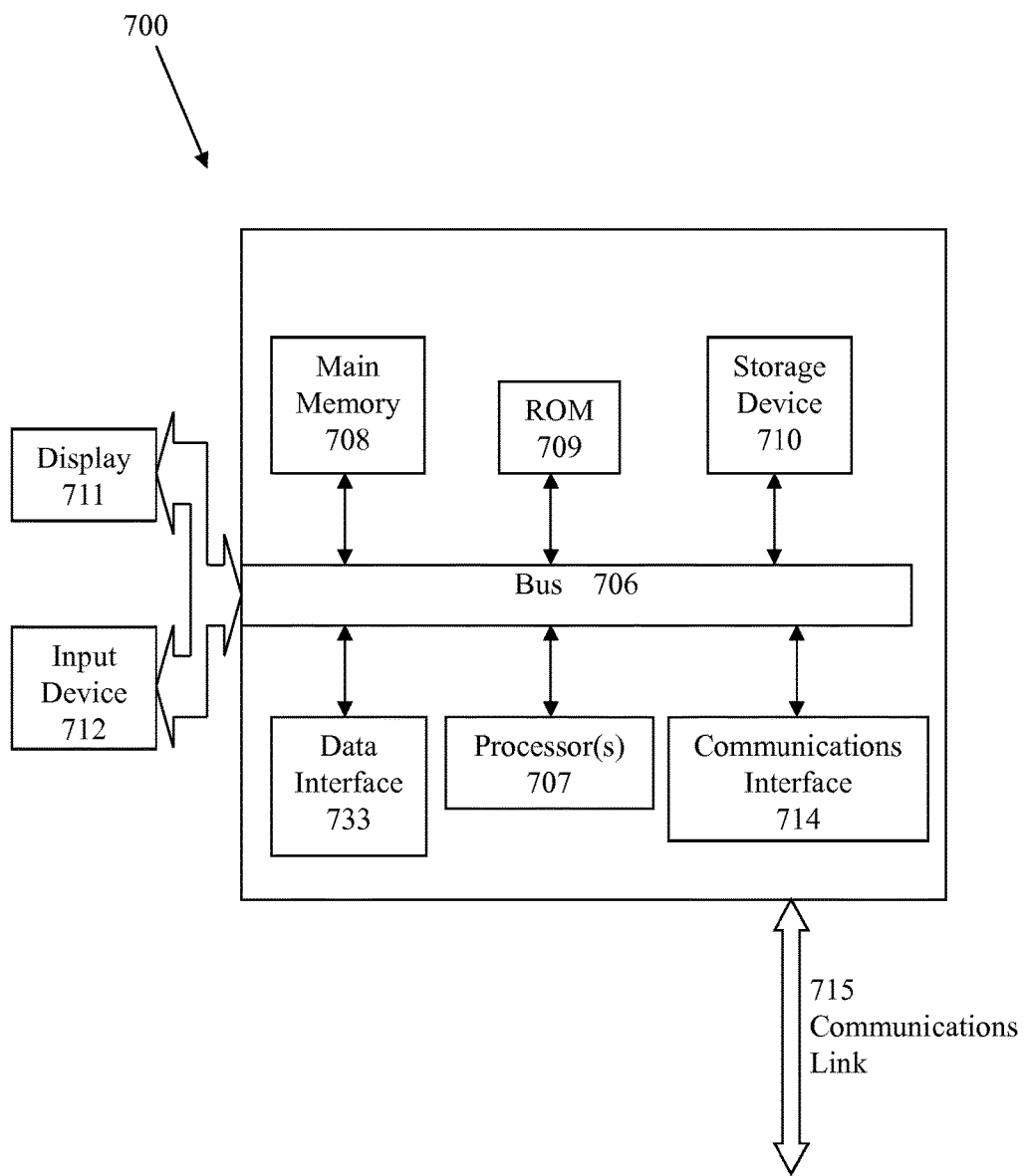
FIG. 7 is a block diagram of an illustrative computing system suitable for implementing an embodiment of the present invention.

FIG. 7 is a block diagram of an illustrative computing system 700 suitable for implementing an embodiment of the present invention. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions to implement the invention. Thus, embodiments of the invention are limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A computer implemented method for generating signatures and locating associations for a game program, comprising:
    extracting, by a processor, information associated with a game program, including:
        identifying, by the processor, a plurality of objects included in a scene;
        determining, by the processor, a number of draw commands associated with each of the identified objects; and
        creating, by the processor, a histogram of a distribution of the identified objects by the number of draw commands required to render each of the plurality of objects, including:
            identifying a plurality of buckets of the histogram, each of the plurality of buckets representing a respective range of a number of draw commands; and
            assigning each of the plurality of objects to one of the plurality of buckets based on the respective number of draw commands required to render the object;
    determining, by the processor, a signature for the scene of the game program, the signature corresponding to the histogram; and
    locating, by the processor, an association for the game program corresponding to the signature.

2. The method of claim 1, further comprising executing the association for the game program corresponding to the signature in response to an external request.

3. The method of claim 1, wherein extracting, by the processor, information associated with the game program is performed in response to a request from a user of the game program selecting the scene.

4. The method of claim 1, further comprising storing information corresponding to the generated signature and the association in a database.

5. The method of claim 1, wherein locating, by the processor, the association for the game program includes accessing stored associations via a third party component.

6. A computer program product comprising a non-transitory computer readable medium, wherein the computer readable medium comprises executable program code for implementing a method for generating signatures and locating associations for a game program, the method comprising:
    extracting information associated with a game program, including:
        identifying a plurality of objects included in a scene;
        determining a number of draw commands associated with each of the identified objects; and
        creating a histogram of a distribution of the identified objects by the number of draw commands required to render each of the plurality of objects, including:
            identifying a plurality of buckets of the histogram, each of the plurality of buckets representing a respective range of a number of draw commands; and
            assigning each of the plurality of objects to one of the plurality of buckets based on the respective number of draw commands required to render the object;
    performing recognition on the extracted information associated with the game program and generating a signature for the scene of the game program, the determined signature matching the histogram; and
    locating an association for the game program corresponding to the generated signature.

7. The computer program product of claim 6, further comprising executing the association for the game program corresponding to the generated signature in response to a user request.

8. The computer program product of claim 6, wherein creating the histogram further comprises performing normalization on the histogram.

9. The computer program product of claim 6, wherein extracting information associated with the game program is performed in response to a request from a user of the game program selecting the scene.

10. The computer program product of claim 6, further comprising storing information corresponding to the generated signature and the association in a database.

11. The computer program product of claim 6, wherein locating the association for the game program comprises accessing stored associations via a third party component.

12. A system for generating signatures and locating associations for a game program, comprising:
    a computing device including a processor, the processor including:
        an extraction module for extracting information associated with the game program, the extraction module being configured to:
            identify a plurality of objects included in a scene;
            determine a number of draw commands associated with each of the identified objects; and
            create a histogram of a distribution of the identified objects by the number of draw commands required to render each of the plurality of objects, including:
                identify a plurality of buckets of the histogram, each of the plurality of buckets representing a respective range of a number of draw commands; and
                assign each of the plurality of objects to one of the plurality of buckets based on the respective number of draw commands required to render the object; and
        a recognition module for performing recognition on the extracted information associated with the game program, the recognition module being configured to:
            generate a signature for the scene of the game program, the determined signature matching the histogram; and
            locate an association for the game program corresponding to the generated signature.

13. The system of claim 12, the processor further comprising:
    an association presenter module for executing the association for the game program corresponding to the generated signature in response to an external request.

14. The system of claim 12, wherein creating the histogram further comprises performing normalization on the histogram.

15. The system of claim 12, the computing device further comprising:
   a database for storing information corresponding to the generated signature and the association.

* * * * *